United States Patent
Masuda et al.

(10) Patent No.: US 6,755,390 B2
(45) Date of Patent: Jun. 29, 2004

(54) ELECTROMAGNETIC VALVE

(75) Inventors: Naoki Masuda, Nagano-ken (JP); Kazuhiro Ota, Nagano-ken (JP); Keiichi Tatsuno, Nagano-ken (JP); Takaomi Shirase, Nagano-ken (JP)

(73) Assignee: Nissin Kogyo Co., Ltd., Nagano-Ken (JP)

( * ) Notice: Subject to any disclaimer, the term of this patent is extended or adjusted under 35 U.S.C. 154(b) by 0 days.

(21) Appl. No.: 10/436,207

(22) Filed: May 13, 2003

(65) Prior Publication Data

US 2003/0213928 A1 Nov. 20, 2003

(30) Foreign Application Priority Data

May 15, 2002 (JP) .................................. P. 2002-140261
Apr. 9, 2003 (JP) .................................. P. 2003-105416

(51) Int. Cl.[7] ............................................ F16K 31/02
(52) U.S. Cl. ........................... 251/30.03; 251/129.15; 251/129.19; 303/119.2
(58) Field of Search ...................... 251/129.15, 129.19, 251/30.03, 30.04; 303/119.2, 119.3

(56) References Cited

U.S. PATENT DOCUMENTS

| | | | |
|---|---|---|---|
| 5,704,587 A | * | 1/1998 | Kuromitsu et al. ..... 251/129.15 |
| 5,735,582 A | * | 4/1998 | Eith et al. ................ 303/119.2 |
| 5,810,330 A | * | 9/1998 | Eith et al. ................ 303/119.2 |
| 5,865,213 A | * | 2/1999 | Scheffel et al. ......... 251/129.15 |
| 5,967,627 A | * | 10/1999 | Hosoya et al. ........... 303/119.2 |
| 6,209,970 B1 | | 4/2001 | Kamiya et al. |
| 6,254,200 B1 | | 7/2001 | Ganzel |
| 6,293,513 B1 | * | 9/2001 | Birkelund ................ 251/30.03 |
| 6,435,210 B1 | * | 8/2002 | Obersteiner et al. ..... 251/30.03 |

FOREIGN PATENT DOCUMENTS

| | | |
|---|---|---|
| EP | 0 997 363 A2 | 5/2000 |
| JP | 2000-219118 | 8/2000 |

OTHER PUBLICATIONS

European Search Report dated Nov. 14, 2003.

* cited by examiner

*Primary Examiner*—John Bastianelli
(74) *Attorney, Agent, or Firm*—McGuireWoods LLP (57) ABSTRACT

An electromagnetic valve has a cylindrical-shaped valve housing, a fixing core; a movable core; a first return spring; a coil; a first valve mechanism including a movable seat member, a second return spring, a first valve part, a first valve seat, and a first valve hole, and a second valve mechanism including a cylindrical-shaped valve seat member, a second valve seat, a second valve hole, and a second valve part, wherein, on the movable seat member, a cylindrical-shaped guide part, when the second valve part is seated on the second valve seat, is cut off from the valve chamber but, when the second valve part is separated from the second valve seat, forms an annular-shaped passage communicating with the valve chamber and is slidably fitted into the second valve hole; and a communication passage for allowing the annular-shaped passage to communicate with the interior of the guide part is formed.

2 Claims, 9 Drawing Sheets

ELECTROMAGNETIC VALVE

BACKGROUND OF THE INVENTION

1. Field of the Invention

The present invention relates to an electromagnetic valve and, in particular, to an improvement in an electromagnetic valve of a normally closed type structured such that, when it is open with a coil energized, the area of a flow passage can be varied according as the fluid pressure of an inlet port is high or low.

2. Description of the Related Art

Conventionally, an electromagnetic valve of this type is already known in, for example, the following JP-A-2000-219118. In JP-A-2000-219118, between a master cylinder and the suction port of a pump, there is interposed an electromagnetic valve and, when the electromagnetic valve is opened with a coil energized, in case where no liquid pressure is output from the master cylinder, first and second valve mechanisms are opened to thereby increase the flow passage area and, in case where the liquid pressure is output from the master cylinder, the second valve mechanism is closed but the first valve mechanism is opened to thereby reduce the flow passage area.

By the way, movable seat members, which respectively constitute part of the first and second valve mechanisms, are structured so as to be movable with respect to each other in the axial direction thereof in the range where they are restricted with respect to a movable core; and, in case where the axial lines of the movable seat members are inclined with respect to the movable core and second valve, in the case of the above-mentioned conventional structure, there is a possibility that either the sitting seal performance between the first valve part and first valve seat or the sitting seal performance between the second valve part and second valve seat can be impaired.

SUMMARY OF THE INVENTION

The present invention aims at eliminating the above drawbacks found in the conventional electromagnetic valve. Accordingly, it is an object of the present invention to provide an electromagnetic valve which can prevent the axial lines of the movable seat members from inclining to thereby be able to positively maintain both of the sitting seal performance between the first valve part and first valve seat or the sitting seal performance between the second valve part and second valve seat.

In attaining the above object, according to the present invention as set forth in a first aspect, there is provided an electromagnetic valve having: a cylindrical-shaped valve housing including an outlet port in one end thereof and an inlet port in the side wall of the axial-direction middle portion thereof; a fixing core to be fixed to the valve housing so as to close the other end of the valve housing in a fluid-tight manner; a movable core stored in the valve housing so as to be opposed to the fixing core; a first return spring applying a spring force for moving the movable core so as to apart from the fixing core; a coil applying an electromagnetic force for attracting the movable core toward the fixing core in energized condition; and, first and second valve mechanisms respectively interposed between the inlet port and outlet port, the first valve mechanism including a movable seat member disposed opposed to the movable core on the opposite side of the fixing core so as to be moved in the axial direction thereof with respect to the movable core in a limited range, a second return spring for pushing the movable seat member to the side where the movable seat member is moved apart from the movable core, a first valve part disposed on the movable core within a valve chamber so formed in the interior of the valve housing as to be in communication with the inlet port, a first valve seat disposed on the movable seat member in such a manner that the first valve part is seated on the first valve seat, and a first valve hole formed in the movable seat member in such a manner that one end thereof is communicatable with the outlet port and the other end thereof is opened in the central portion of the first valve seat, the second valve mechanism including a cylindrical-shaped valve seat member fittable and fixable to one end side of the valve housing while forming the valve chamber between the movable core and itself, a second valve seat disposed on the valve seat member so as to be situated coaxially with the first valve seat and faces the valve chamber, a second valve hole formed in the valve seat member so as to be larger in diameter than the first valve hole, communicates with the outlet port and is opened in the central portion of the second valve seat, and a second valve part disposed on the outer periphery of the movable seat member so as to be seated on the second valve seat, wherein, on the movable seat member, there is integrally disposed a cylindrical-shaped guide part which, when the second valve part is seated on the second valve seat, is cut off from the valve chamber but, when the second valve part is separated from the second valve seat, forms an annular-shaped passage communicating with the valve chamber and is slidably fitted into the second valve hole; and, in the guide part, there is formed a communication passage for allowing the annular-shaped passage to communicate with the interior of the guide part.

According to the structure of the present invention as set forth in the first aspect, the movable seat member is guided by the guide part, which can be slidably fitted into the second valve hole, in such a manner that it is prevented from inclining with respect to the axial lines of the movable core and second valve seat, thereby being able to prevent the axial line of the movable seat member from inclining, which makes it possible to maintain positively not only the sitting seal performance between the first valve part and first valve seat but also the sitting seal performance between the second valve part and second valve seat. Also, in a state where the second valve part is rises up or is separated from the second valve seat and the second valve mechanism is thereby opened, there can be secured a flow passage which communicates from the valve chamber through the annular-shaped passage, communication passage and the interior of the guide part to the outlet port.

Also, according to the present invention as set forth in a second aspect, in addition to the structure of the present invention as set forth in the first aspect, an annular-shaped vacuum pressure chamber, which is situated between the second valve seat and annular-shaped passage while the second valve part is seated on the second valve seat, is formed between the inner surface of the second valve hole and the outer surface of the movable seat member in such a manner that pressure receive area thereof facing the movable seat member on the second valve seat side is set larger than pressure receive area thereof facing the movable seat member on the annular-shaped passage side; and, in the movable seat member, there is formed a communication hole for allowing the annular-shaped vacuum pressure chamber to communicate with the intermediate portion of the first valve hole. According to the present structure, a state, in which the first valve mechanism is open and the second valve mechanism is closed, can be maintained more positively. That is, the state, where the first valve mechanism is open and the second valve mechanism is closed, is maintained due to generation of a fluid pressure force which, due to a pressure difference between the fluid pressure on the valve chamber side and the fluid pressure on the outlet port side lower than the fluid pressure on the valve chamber side, presses the movable seat member toward the side where the second valve part can be seated on the second valve seat; but, in case where a pressure difference between the fluid pressure on the valve chamber and the fluid pressure on the outlet port side is small, there is a possibility that the closed state of the second valve mechanism cannot be maintained. However, since the fluid is sucked out from the annular-shaped vacuum pressure chamber through the communication hole to the first valve hole side as the fluid flows through the first valve hole, there can be generated a vacuum pressure force which attracts the movable seat member to the side where the second valve part can be seated on the second valve seat; and, therefore, even in case where the pressure difference between the fluid pressure on the valve chamber side and the fluid pressure on the outlet port side is small, the closed state of the second valve mechanism can be maintained more positively.

DETAILED DESCRIPTION OF THE PREFERRED EMBODIMENTS

Now, description will be given below of the mode for carrying out the present invention with reference to the embodiments of an electromagnetic valve according to the present invention shown in the accompanying drawings.

Figure 1:
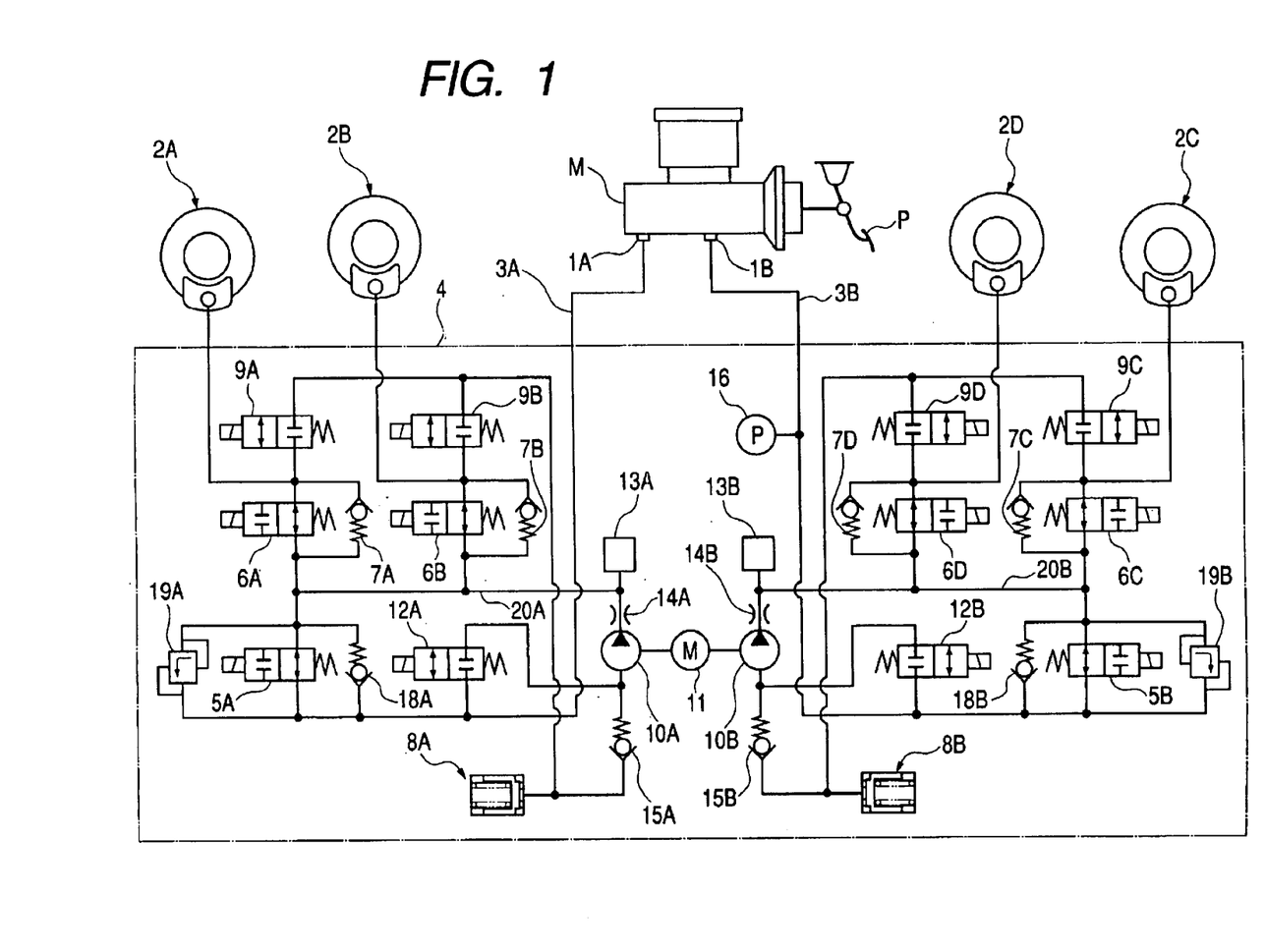
FIG. 1 is a circuit diagram of a brake fluid pressure circuit for use in a vehicle brake apparatus to which a first embodiment of a suction valve serving as an electromagnetic valve according to the present invention is applied.
Figure 2:
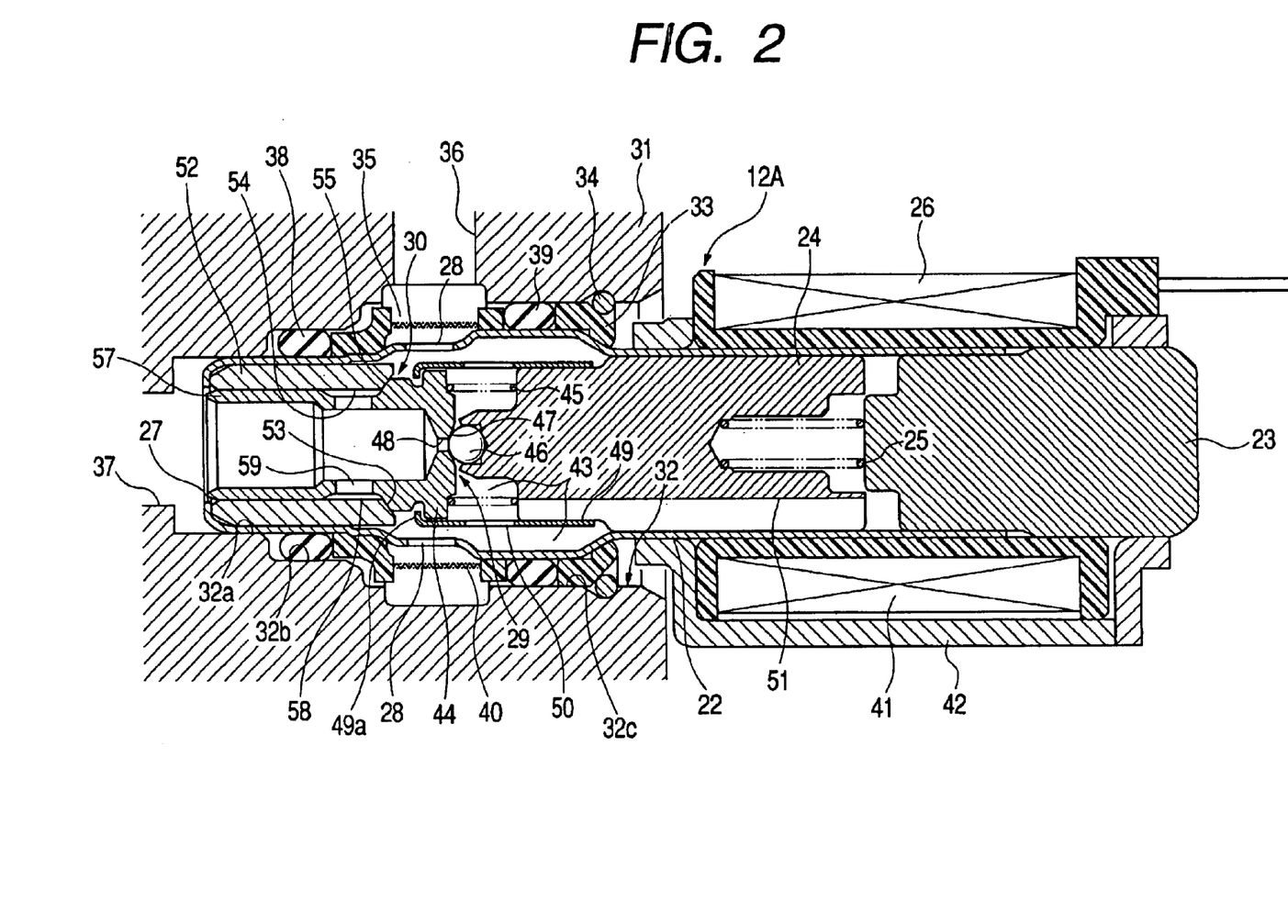
FIG. 2 is a longitudinal section view of a suction valve serving as an electromagnetic valve according to the first embodiment, showing its open state.
Figure 3:
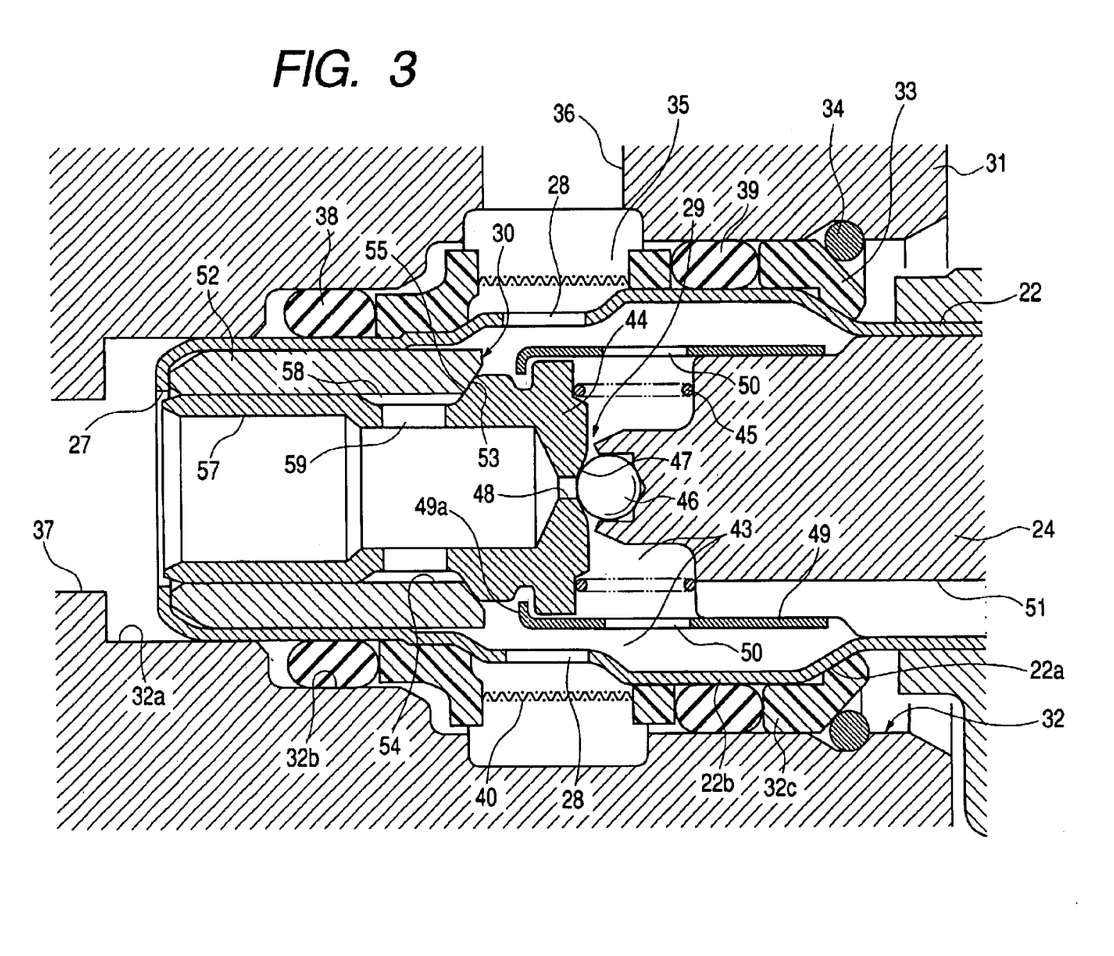
FIG. 3 is an enlarged view of the main portions of FIG. 2.
Figure 4:
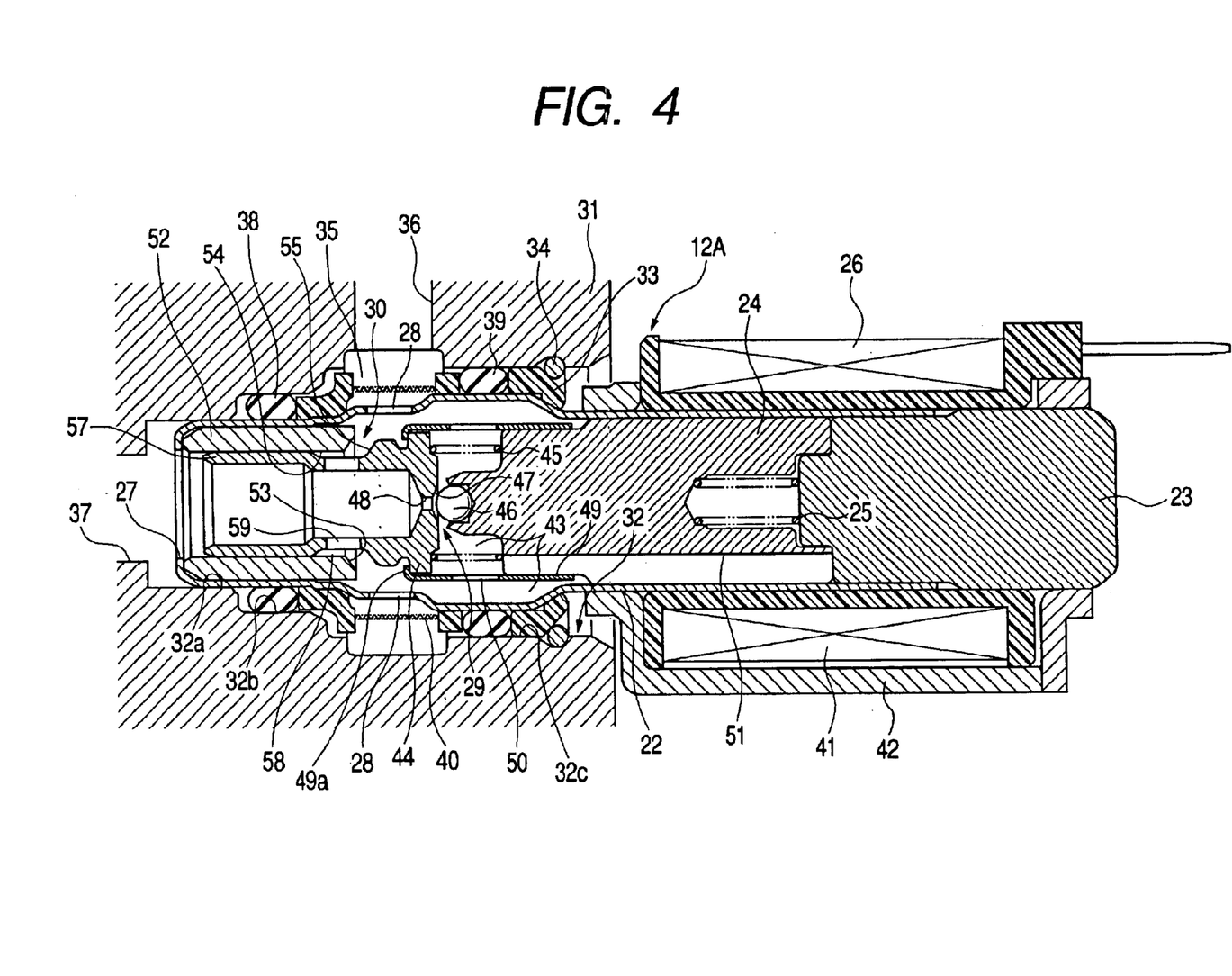
FIG. 4 is a section view corresponding to FIG. 2, showing a state in which a second valve mechanism is open.
Figure 5:
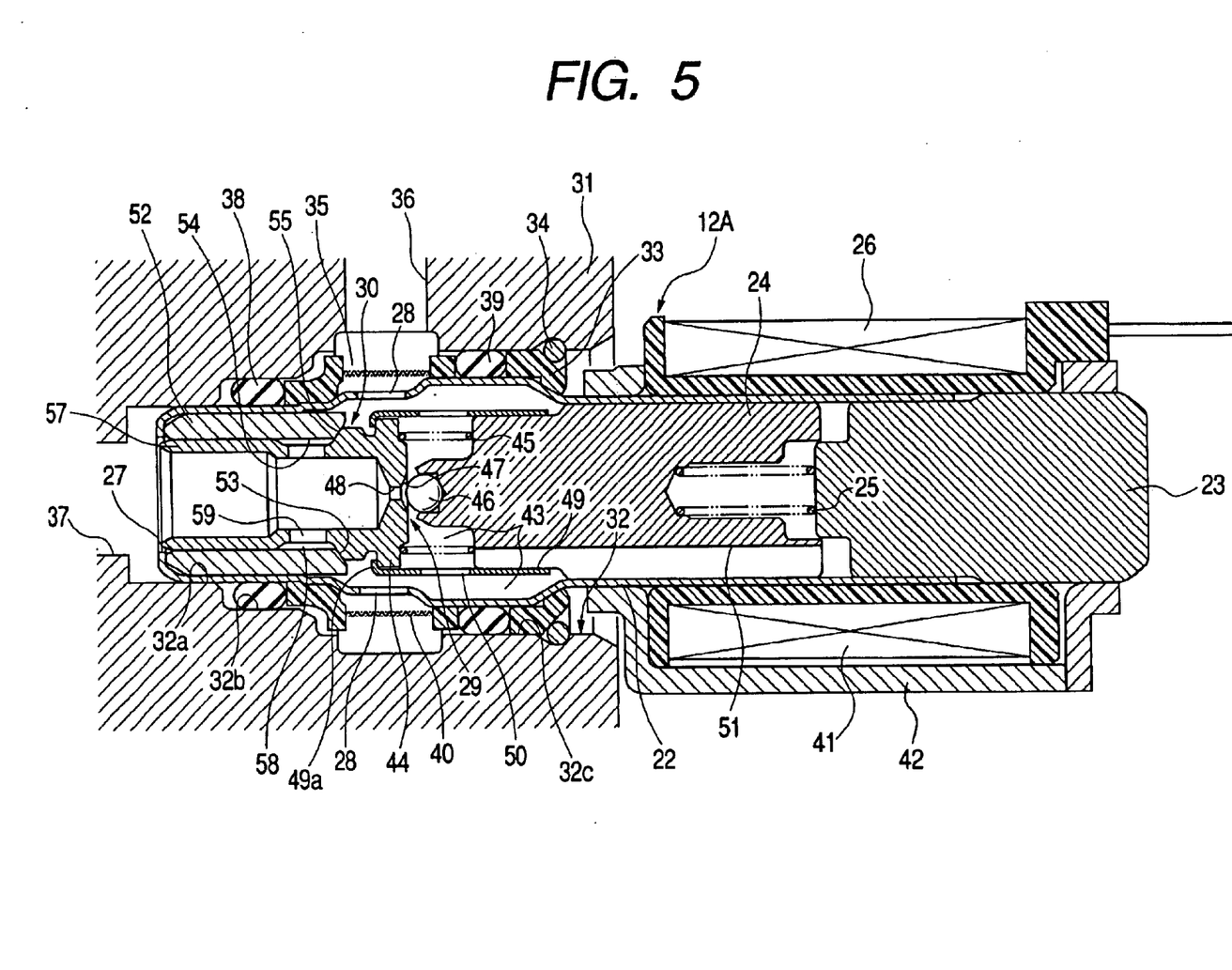
FIG. 5 is a longitudinal section view corresponding to FIG. 2, showing a state in which a first valve mechanism is open.

FIGS. 1 to 5 respectively show a first embodiment of an electromagnetic valve according to the present invention. Specifically, FIG. 1 is a circuit diagram of a brake fluid pressure circuit for use in a vehicle brake apparatus, FIG. 2 is a longitudinal section view of a suction valve serving as an electromagnetic valve according to the present embodiment, showing its open state, FIG. 3 is an enlarged view of the main portions of FIG. 2, FIG. 4 is a section view corresponding to FIG. 2, showing a state in which a second valve mechanism is open, and FIG. 5 is a longitudinal section view corresponding to FIG. 2, showing a state in which a first valve mechanism is open.

Firstly, in FIG. 1, a master cylinder M of a tandem type includes first and second output ports 1A, 1B which generate a brake fluid pressure according to a stepping force to be applied to a brake pedal P by a vehicle driver; and, a brake fluid pressure control apparatus 4 is interposed between a left front wheel brake 2A, a right rear wheel brake 2B, a right front wheel brake 2C, a left rear wheel brake 2D, and first and second output liquid pressure passages 3A, 3B individually connected to the first and second output ports 1A, 1B.

The brake fluid pressure control apparatus 4 comprises: cut valves 5A, 5B which are electromagnetic valves each of a normally open type respectively connected to the first and second output liquid pressure passages 3A, 3B; inlet valves 6A, 6B which are electromagnetic valves of a normally open type respectively interposed between one cut valve 5A and left front wheel brake 2A and right rear wheel brake 2B; inlet valves 6C, 6D which are electromagnetic valves of a normally open type respectively interposed between the other cut valves 5B and right front wheel brake 2C and left rear wheel brake 2D; check valves 7A–7D respectively connected in parallel to the inlet valves 6A–6D; first and second reservoirs 8A, 8B respectively corresponding to the first and second output liquid pressure passages 3A, 3B individually; outlet valves 9A, 9B which are electromagnetic valves of a normally closed type respectively interposed between the first reservoir 8A and left front wheel brake 2A and right rear wheel brake 2B; outlet valves 9C, 9D which are electromagnetic valves of a normally closed type respectively interposed between the second reservoir 8B and right front wheel brake 2C and left rear wheel brake 2D; a first pump 10A the suction side of which is connected to the first reservoir 8A and the jet-out side of which is connected to between the cut valve 5A and inlet valves 6A, 6B; a second pump 10B the suction side of which is connected to the second reservoir 8B and the jet-out side of which is connected to between the cut valve 5B and inlet valves 6C, 6D; a common electric motor 11 for driving the two pumps 10A, 10B; suction valves 12A, 12B which are electromagnetic valves of a normally closed type respectively interposed between the first and second output liquid pressure passages 3A, 3B and the suction sides of the first and second pumps 10A, 10B; first and second dampers 13A, 13B to which the jet-out sides of the first and second pumps 10A, 10B can be respectively connected; first and second orifices 14A, 14B respectively interposed between the first and second pumps 10A, 10B and first and second dampers 13A, 13B; check valves 15A, 15B respectively interposed between the first and second pumps 10A, 10B and first and second reservoirs 8A, 8B so as to allow the brake fluid to flow to the two pumps 10A, 10B sides; a pressure sensor 16 to be mounted on the second output liquid pressure passage 3B; one-way valves 18A, 18B respectively connected in parallel to the cut valves 5A, 5B so as to allow the flow of only the brake fluid from the first and second output liquid pressure passages 3A, 3B; and, relief valves 19A, 19B respectively connected in parallel to the cut valves 5A, 5B.

The suction valves 12A, 12B are respectively connected between the first and second pumps 10A, 10B and check valves 15A, 15B, while the outlet valves 9A–9D are respectively connected between the check valves 15A, 15B and first and second reservoirs 8A, 8B. Between liquid pressure passages 20A, 20B, which are connected to the pumps 10A, 10B through the orifices 14A, 14B and dampers 13A, 13B, and output liquid pressure passages 3A, 3B, there are interposed the cut valves 5A, 5B, one-way valves 18A, 18B and relief valves 19A, 19B, while the relief valves 19A, 19B can be opened as the liquid pressure of the liquid pressure passages 20A, 20B exceeds a given value.

The thus-structured brake fluid pressure control apparatus 4, in a normal brake state in which there is no possibility that the respective wheels can be locked, connects the master cylinder M to the wheel brakes 2A–2D and also cut off the connection between the wheel brakes 2A–2D and reservoirs 8A, 8B. That is, the cut valves 5A, 5B are deenergized and opened and the suction valves 12A, 12B are deenergized and opened. In this state, the respective inlet valves 6A–6D are deenergized and opened and the respective output valves 9A–9D are also deenergized and opened, while the brake fluid pressure output from the first output port 1A of the master cylinder M is applied to the left front and right rear wheel brakes 2A, 2B through the cut valve 5A and inlet valves 6A, 6B. Also, the brake fluid pressure output from the second output port 1B of the master cylinder M is applied to the right front and left rear wheel brakes 2C, 2D through the cut valve 5B and inlet valves 6C, 6D.

When any of the wheels is going to be locked during the above braking operation, the brake fluid pressure control apparatus 4 cuts off the connection between the master cylinder M and wheel brakes 2A–2D and allows the wheel brakes 2A–2D and reservoirs 8A, 8B to communicate with each other, in the portion that corresponds to the wheel going to be locked. That is, in the inlet valves 6A–6D, the inlet valve corresponding to the wheel going to be locked is energized and closed and, at the same time, one of the outlet valves 9A–9D corresponding to the wheel going to be locked is energized and opened. Due to this, part of the brake fluid pressure of the wheel going to be locked is absorbed by the first reservoir 8A or second reservoir 8B, thereby reducing the brake fluid pressure of the wheel going to be locked.

When maintaining the brake fluid pressure at a constant level, the brake fluid pressure control apparatus 4 cuts off the wheel brakes 2A–2D from the master cylinder M and reservoirs 8A, 8B. That is, the inlet valves 6A–6D are energized and closed and, at the same time, the outlet valves 9A–9D are deenergized and closed. Further, when increasing the brake fluid pressure, the inlet valves 6A–6D are deenergized and opened and, at the same time, the outlet valves 9A–9D are deenergized and closed.

In this manner, in a state where the cut valves 5A, 5B are deenergized and opened and also the suction valves 12A, 12B are deenergized and closed, by controlling the deenergization and energization of the inlet valves 6A–6D and outlet valves 9A–9D, the wheels can be braked with good efficiency without locking the wheels.

By the way, during the above-mentioned anti-lock brake control, the electric motor 11 is rotated and operated and, with the operation of the electric motor 11, the first and second pumps 10A, 10B are driven; and, therefore, the brake fluid absorbed by the first and second reservoirs 8A, 8B is sucked into the first and second pumps 10A, 10B and is then returned through the first and second dampers 13A, 13B to the first and second output liquid pressure passages 3A, 3B. Such return of the brake fluid can prevent an increase in the stepping amount of the brake pedal P due to the absorption of the brake fluid by the first and second reservoirs 8A, 8B. Also, the pulsations of the jet-out pressures of the first and second pumps 10A, 10B are restricted due to the actions of the first and second dampers 13A, 13B and first and second orifices 14A, 14B, which eliminates a fear that the operation feeling of the brake pedal P can be impaired.

Also, the brake fluid pressure control apparatus 4, in addition to the above-mentioned anti-lock brake control, in a non-brake operation state, drives the first and second pumps 10A, 10B using the electric motor 11 and also opens and closes the cut valves 5A, 5B, thereby being able to carry out vehicle stability control and traction control.

Further, the pressure sensor 16 is used to detect whether the liquid pressure is output from the master cylinder M or not, that is, whether the brake pedal P is stepped down or not; and thus, the pressure sensor 16 can be used for the above-mentioned vehicle stability control and traction control as well as for control of the number of rotations of the electric motor 11 according to the output liquid pressure of the master cylinder M.

Accordingly, for example, in the vehicle stability control, the cut valves 5A, 5B are energized and closed and also the suction valves 12A, 12B are energized and opened; and, further, due to the operation of the electric motor 11, the first and second pumps 10A, 10B are driven and, of the inlet valves 6A–6D, other inlet valves than the inlet valves corresponding to the wheel to be braked are energized and closed.

As a result of this, the two pumps 10A, 10B suck the brake fluid of the master cylinder M from the first and second output ports 1A, 1B through the first and second output liquid pressure passages 3A, 3B and suction valves 12A, 12B, and supply the brake fluid to the selected one of the wheel brakes 2A–2D through the opened one of the inlet valves 6A–6D; and, in this case, since the cut valves 5A, 5B are closed, the brake fluid is prevented from flowing backward to the master cylinder M side.

In such vehicle stability control and traction control, in case where the jet-out pressure of the first and second pumps 10A, 10B, that is, the liquid pressure between the cut valves 5A, 5B and inlet valves 6A–6D exceeds a specified value, a surplus component of the liquid pressure is escaped to the master cylinder M side by relief valves 19A, 19B, which avoids a possibility that an excessive liquid pressure can be applied to the interior of the wheel brake to which the brake pressure is applied and to the interior of the liquid pressure control apparatus 4.

By the way, the suction valves 12A, 12B are structured according to the present invention and the details of which will be described below. However, since the two suction valves 12A, 12B are the same in structure, description will be given below of only the details of the structure of one suction valve 12A and thus the description of the other suction valve 12B is omitted here.

Referring to FIG. 2, the suction valve 12A comprises the following composing parts: that is, a small-thickness cylindrical-shaped valve housing 22 including an outlet port 27 in one end thereof and a plurality of inlet ports 28, 28, ... in the side wall of the axial-direction middle portion thereof; a fixing core 23 to be fixed to the housing 22 so as to close the other end of the valve housing 22 in a liquid-tight manner; a movable core 24 to be stored in the valve housing 22 in such a manner that it is disposed opposed to the fixing core 23; a first return spring 25 capable of applying a spring force for moving the movable core 24 apart from the fixing core 23; a coil 26, when energized, capable of applying an electromagnetic force for attracting the movable core 24 to the fixing core 23 side; and, first and second valve mechanisms 29, 30 respectively interposed between the outlet port 27 and inlet ports 28, 28.

Now, referring to FIGS. 2 and 3 in combination, in the axial-direction middle portion of the valve housing 22, for example, there is formed a tapered increased-diameter portion 22b which includes a stepped portion 22a on the axial-direction other end side thereof and is expanded outwardly in the radius direction of the valve housing 22. This increased-diameter portion 22b is structured such that the diameter thereof decreases gradually as the portion 22b approaches the axial-direction one end side of the valve housing 22 and it includes a plurality of steps, for example, three steps; and, in the middle portion of the increased-diameter portion 22b, there are formed the above-mentioned plurality of inlet ports 28, 28, . . .

The one end side of the valve housing 22 is to be inserted into and fixed to a base member 31; and, in the base member 31, there is formed a mounting hole 32 into which the one-end side of the valve housing 22 including the stepped portion 22a and increased-diameter portion 22b can be inserted. This mounting hole 32 comprises a small-diameter hole portion 32a, a medium-diameter hole portion 32b larger in diameter than the small-diameter portion 32a, and a large-diameter hole portion 32c larger in diameter than the medium-diameter portion 32b, while these three hole portions are coaxial with one another and are continuously connected with one another in the above order starting from the axial-direction one end side of the mounting hole 32. The small-diameter hole portion 32a has a diameter which allows the small-diameter hole portion 32a to be fitted with the one-end portion of the valve housing 22 shifted from the increased-diameter portion 22b, while the other end of the large-diameter hole portion 32c is opened up in the outer surface of the base member 31.

On the outer periphery of the valve housing 22, there is mounted a ring-shaped hold member 33 in such a manner that it is contacted and engaged with the other ends of the stepped portion 22a and increased-diameter portion 22b. In case where a snap ring 34 to be mounted on the near-to-outer-end inner surface of the large-diameter hole portion 32a of the mounting hole 32 is contacted and engaged with the hold member 33, the valve housing 22 can be prevented against removal from the mounting hole 32 and can be inserted into and fixed to the base member 31.

Between the inner surfaces of the medium-diameter hole portion 32b and large-diameter hole portion 32c of the mounting hole 32 and the outer surface of the valve housing 22, there is formed an annular-shaped passage 35 which communicates with the inlet ports 28, 28, . . . ; and, in the base member 31, there is formed a passage 36 which allows the annular-shaped passage 35 to communicate with the first output liquid pressure passage 3A. Also, in the base member 31, there is formed a passage 37 which is coaxially connected with the small-diameter hole portion 32a of the mounting hole 32 in such a manner that it communicates with the outlet port 27 of the valve housing 22, while the passage 37 is connected to the suction side of the first pump 10A.

On the outer periphery of the other end portion of the valve housing 22 that exists between the annular-shaped passage 35 and passage 37, there is mounted an O ring 38, while another O ring 39 holding the annular-shaped passage 35 between the O ring 38 and itself is mounted on the outer periphery of the other end portion, that is, the largest-diameter portion of the increased-diameter portion 22b of the valve housing 22.

In this manner, since the diameter of the O ring 38 to be elastically contacted with the inner-end side inner surface of the mounting hole 32 is set smaller than the diameter of the O ring 39 to be elastically contacted with the outer-end side inner surface of the mounting hole 32, when inserting and assembling the valve housing 22 into the mounting hole 32, the O ring 38 can be prevented from being damaged when it is contacted with the inner surface of the mounting hole 32; and, there can be reduced the force that is necessary to insert and assemble the valve housing 22 into the mounting hole 32, thereby being able to facilitate the inserting and assembling operations of the valve housing 22.

On the outer periphery of the valve housing 22 that exists between the two O rings 38, 39, there is mounted a filter 40 which allows the inlet ports 28, 28, . . . to communicate with the annular-shaped passage 35.

The fixing core 23 is welded to the other end portion of the valve housing 22 in a liquid tight manner by laser welding or the like. The portion of the valve housing 22 projecting from the base member 31 and fixing core 23 are to be inserted into a bobbin 41, while the coil 26 is wound on the bobbin 41. Also, a coil case 42 made of magnetic material for covering the bobbin 41 and coil 26 is magnetically connected to the fixing core 23. Thus, the movable core 24 is attracted toward the fixing core 23 side by the electromagnetic force that is generated by the coil 26 when it is energized.

The first valve mechanism 29 is composed of a movable seat member 44 movable in the axial direction with respect to the movable core 24 in a limited range and disposed opposed to the movable core 24 on the opposite side of the fixing core 23, a second return spring 45 for energizing the movable seat member 44 in a direction where the movable seat member 44 moves apart from the movable core 24, a spherical-shaped first valve part 46 disposed on the movable core 24 within a valve chamber 43 so formed in the interior of the valve housing 22 as to communicate with the inlet ports 28, 28, . . . , a first valve seat 47 formed in the movable seat member 44 so as to allow the first valve part 46 to be seated thereon, and a first valve hole 48 formed in the movable seat member 44 in such a manner that one end thereof communicates with the outlet port 27 and the other end thereof is opened in the central portion of the first valve seat 47.

To one end of the movable core 24, there is coaxially fixed a cylindrical-shaped guide cylinder 49 which is disposed within the valve chamber 43 and, in the guide cylinder 49, there are formed a plurality of communication holes 50, 50, . . . which are used to prevent the valve chamber 43 from being divided into sub-sections. Also, the end portion of the movable seat member 44 on the movable core 24 side is inserted into the guide cylinder 49 in such a manner that it can be moved in the axial direction; and, to one end of the guide cylinder 49, there is formed an engaging flange 49a which can be contacted and engaged with the movable seat member 44 from the opposite side to thereby restrict the maximum distance between the movable core 24 and movable seat member 44. That is, the movable seat member 44 is disposed opposed to the movable core 24 in such a manner that the axial-direction moving range thereof with respect to the movable core 24 is restricted by the guide cylinder 49.

Also, in the outer surface of the movable core 24, there is formed a communication groove 51 which allows a space between the movable core 24 and fixing core 23 to communicate with the valve chamber 43.

Now, the second valve mechanism 30 is composed of a valve seat member 52 which forms the valve chamber 43 between the movable core 24 and itself and is fitted with and fixed to the one-end side of the valve housing 22, a second valve seat 53 situated coaxially with the first valve seat 47 and disposed on the valve seat member 52 so as to face the valve chamber 43, a second valve hole 54 formed in the valve seat member 52 in such a manner that it is larger in diameter than the first valve hole 48, communicates with the outlet port 27 and is opened up in the central portion of the second valve seat 53, and a second valve part 55 disposed on the outer periphery of the movable seat member 44 in such a manner that it can be seated on the second valve seat 53.

The valve seat member 52 is formed in a cylindrical shape in which the second valve hole 54 larger in diameter than the first valve hole 48 is formed over the axial-direction entire length of the valve seat member 52; and, the valve seat member 52 can be fitted into and fixed to one end portion of the valve housing 22 by pressure insertion or the like. The second valve seat 53 is disposed on the end face of the valve seat member 52 on the valve chamber 43 side, while the second valve part 55 is disposed on the outer periphery of the middle portion of the movable seat member 44.

Also, on the movable seat member 44, there is disposed a cylindrical-shaped guide part 57 so as to be integral with the movable seat member 44; and, the guide part 57 can be slidably fitted into the second valve hole 54. Between the outer surface of the guide part 57 and the inner surface of the second valve hole 54, there is formed an annular-shaped passage 58 which, when the second valve part 55 is seated on the second valve seat 53, is cut off from the valve chamber 43 but, when the second valve part 55 is not seated on the second valve seat 53, is allowed to communicate with the valve chamber 43. And, there are formed a plurality of communication passages 59, . . . which allow the annular-shaped passage 58 to communicate with the interior of the guide part 57.

In the thus-structured suction valve 12A, when the coil 26 is deenergized, as shown in FIGS. 2 and 3, the movable core 24 has been moved due to the spring force of the first return spring 25 to the side where the movable core 24 moves apart from the fixing core 23; and, in this state, not only the first valve part 46 is seated on the first valve seat 47 and thus the first valve mechanism 29 is closed but also the second valve part 55 is seated on the second valve seat 53 and thus the second valve mechanism 30 is closed, thereby cutting off the communication between the master cylinder M and first pump 10A.

Also, in case where the coil 26 is energized in a state where the master cylinder M is not in operation, as shown in FIG. 4, the movable core 24 is attracted toward the fixing core 23 side. Due to this, the movable seat member 44 contacted and engaged with the engaging flange 49*a* of the guide cylinder 49 is also attracted toward the fixing core 23 side, so that not only the first valve part 46 is separated from the first valve seat 47 and thus the first valve mechanism 29 is opened but also the second valve part 55 is separated from the second valve seat 53 and thus the second valve mechanism 30 is opened, thereby allowing the master cylinder M and first pump 10A to communicate with each other. In this state, the flow passage area between the inlet ports 28, 28, . . . and outlet port 27 is relatively large and, therefore, a relatively large quantity of brake fluid is sucked from the master cylinder M into the first pump 10A.

Further, in case where the coil 26 is energized while the master cylinder M is in operation, as shown in FIG. 5, the movable core 24 is attracted toward the fixing core 23 side; however, due to the liquid pressure that is applied to the valve chamber 43 from the master cylinder M, the liquid pressure pressing the second valve part 55 of the movable seat member 44 against the second valve seat 53 is larger than the electromagnetic force which attracts the movable core 24 toward the fixing core 23 side. As a result of this, the second valve part 55 is seated on the second valve seat 53 to thereby close the second valve mechanism 30, whereas the first valve part 46 is separated from the first valve seat 47 due to the spring force of the second return spring 45 and the electromagnetic attracting force of the coil 26, thereby opening the first valve mechanism 29. Therefore, the flow passage area between the inlet ports 28, 28, . . . and outlet port 27 is relatively small, so that the brake fluid to be supplied from the master cylinder M to the first pump 10A is reduced.

Next, description will be given below of the operation of the first embodiment of a suction valve, that is, an electromagnetic valve according to the present invention. On the movable seat member 44, integrally therewith, there is disposed the cylindrical-shaped guide part 57 which forms such annular-shaped passage 58 between the inner surface of the second valve hole 54 and itself that, when the second valve part 55 is seated on the second valve seat 53, is cut off from the valve chamber 43 but, when the second valve part 55 is separated from the second valve seat 53, is allowed to communicate with the valve chamber 43 and is slidably fitted into the second valve hole 54; and, in the guide part 57, there are formed the above-mentioned plurality of communication passages 59, . . . which allow the annular-shaped passage 58 to communicate with the interior of the guide part 57.

Therefore, the movable seat member 44 is guided by the guide part 57, which can be slidably fitted into the second valve hole 54, in such a manner that it is prevented from inclining with respect to the axial lines of the movable core 24 and second valve seat 53. As a result of this, the axial line of the movable seat member 44 can be prevented from inclining, which in turn can maintain positively the sitting seal performance between the first valve part 46 and first valve seat 47 as well as the sitting seal performance between the second valve part 55 and second valve seat 53.

Also, in a state where the second valve part 55 is separated from the second valve seat 53 and the second valve mechanism 30 is thereby opened, there is formed a flow passage which communicates from the valve chamber 43 through the annular-shaped passage 58, communication passages 59, . . . and guide part 57 to the outlet port 27.

Figure 6:
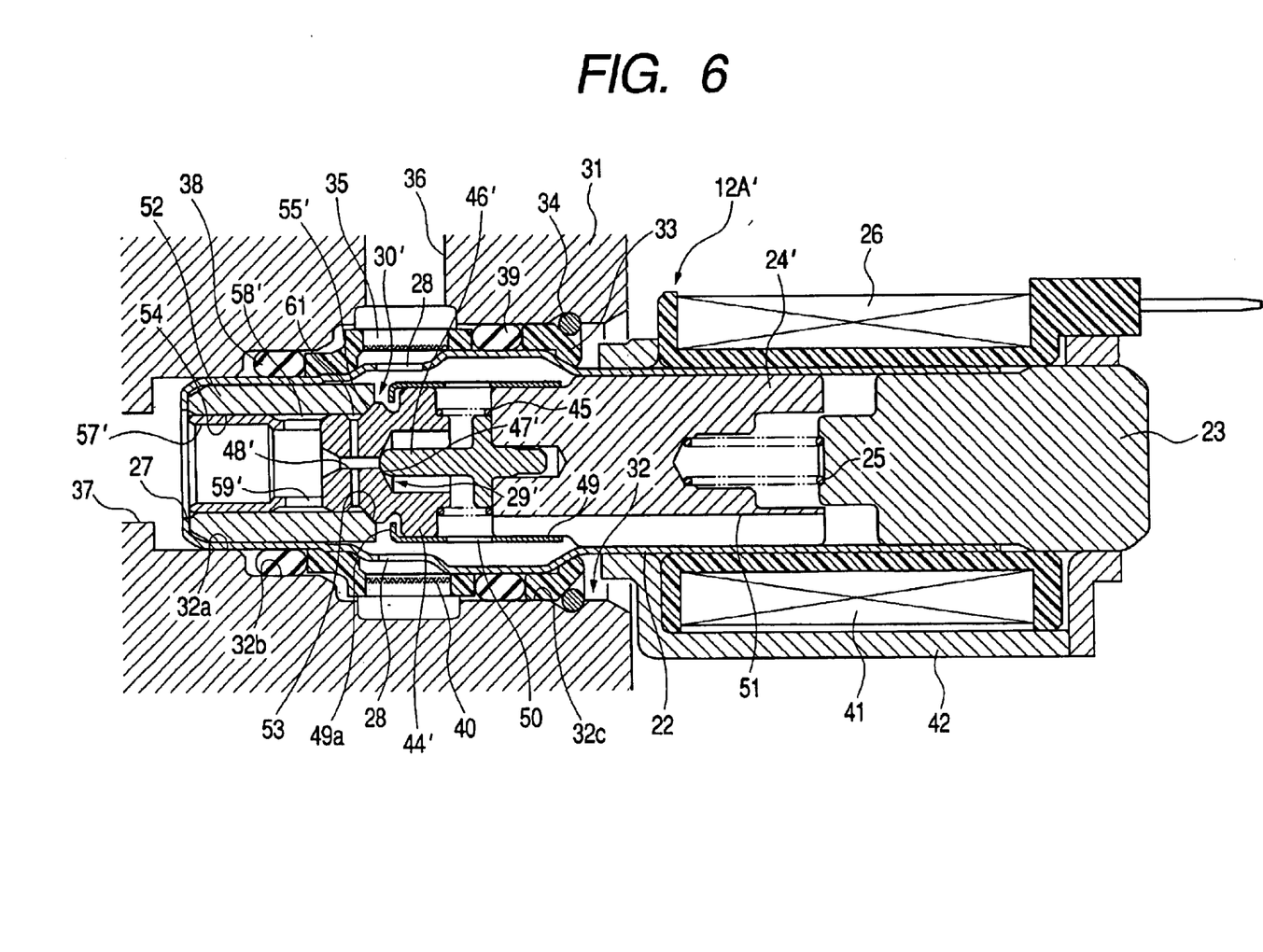
FIG. 6 is a longitudinal section view of a suction valve serving as an electromagnetic valve according to a second embodiment of a suction valve serving as an electromagnetic valve according to the present invention, showing its open state.
Figure 7:
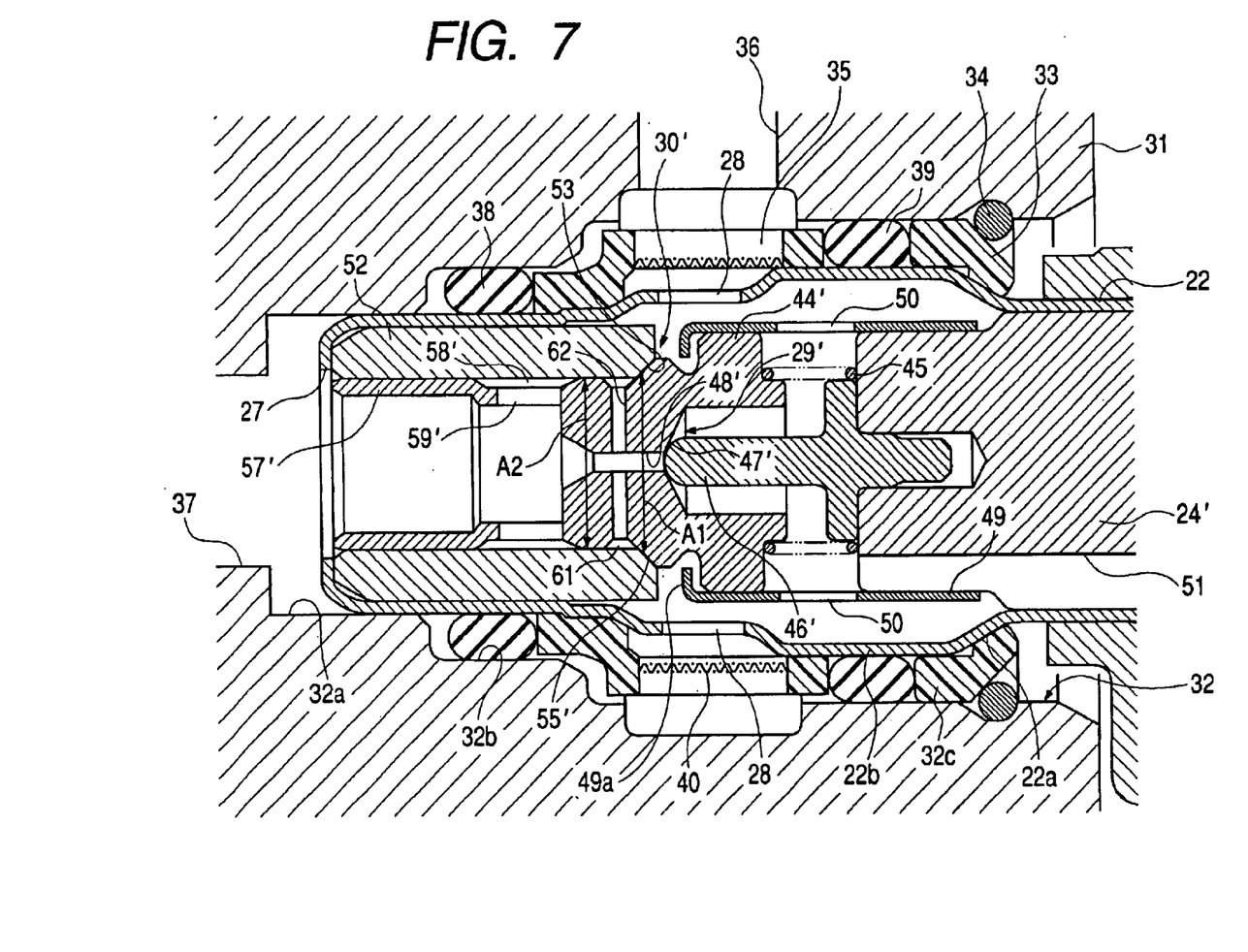
FIG. 7 is an enlarged view of the main portions of FIG. 6.
Figure 8:
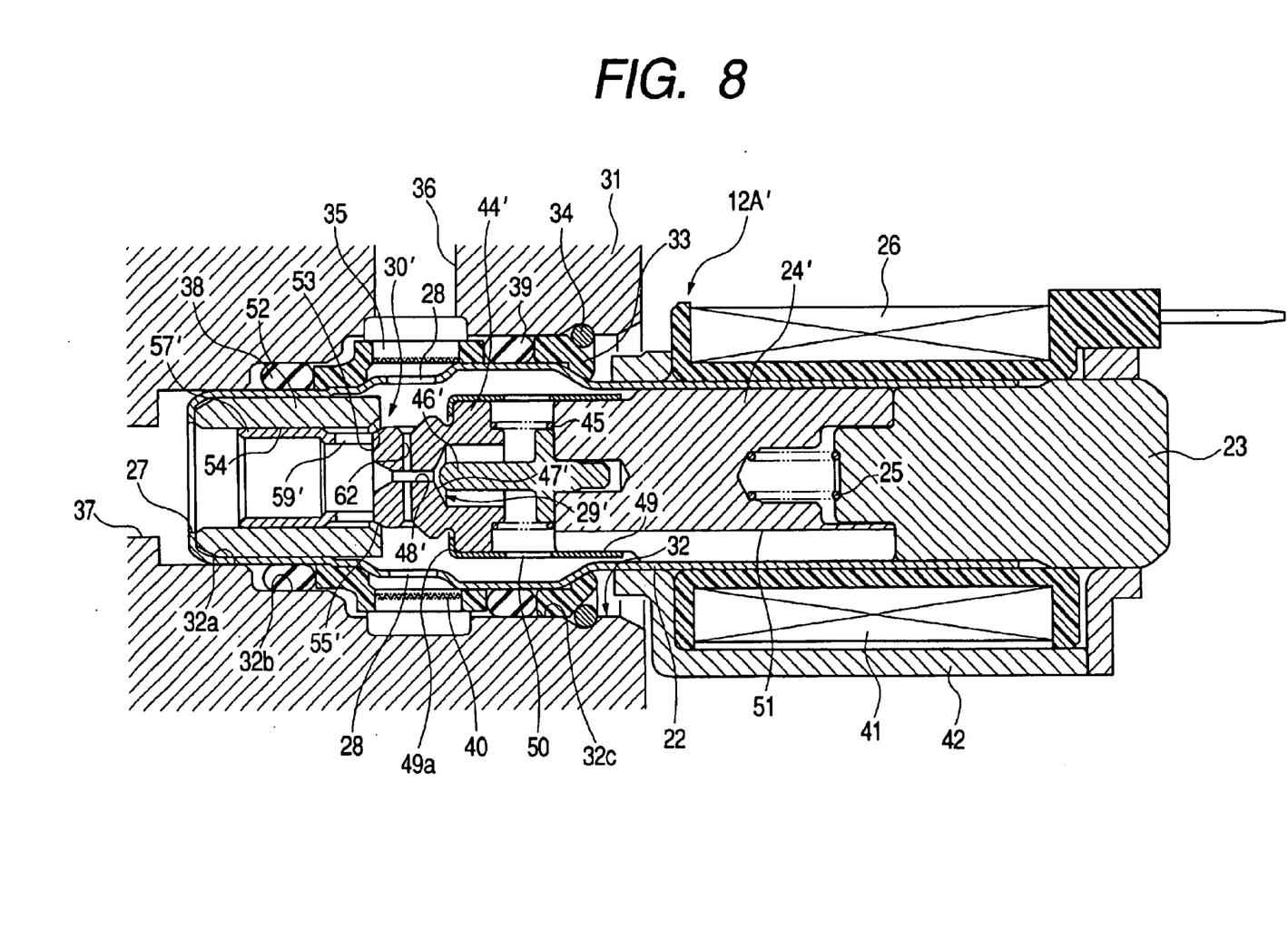
FIG. 8 is a section view corresponding to FIG. 6, showing a state in which a second valve mechanism is open; and, FIG. 9 is a longitudinal section view corresponding to FIG. 6, showing a state in which a first valve mechanism is open.
Figure 9:
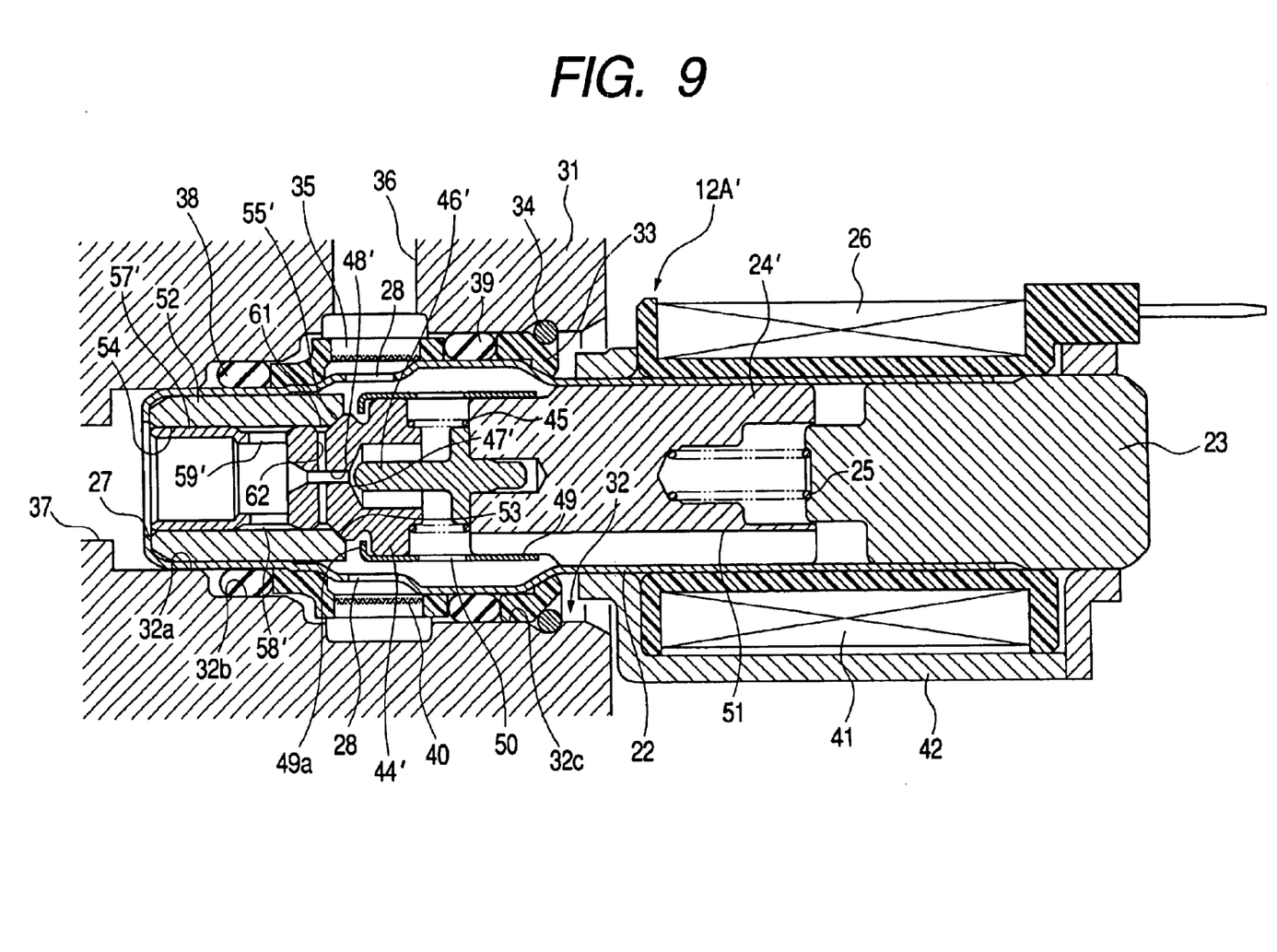

Now, FIGS. 6 to 9 respectively show a second embodiment of a suction valve serving as an electromagnetic valve according to the present invention. Specifically, FIG. 6 is a longitudinal section view of a suction valve, showing a state in which a suction valve is closed; FIG. 7 is an enlarged view of the main portions of FIG. 6; FIG. 8 is a section view of the suction valve corresponding to FIG. 6, showing a state in which a second valve mechanism is opened; and, FIG. 9 is a longitudinal section view thereof corresponding to FIG. 6, showing a state in which a first valve mechanism is opened.

Firstly, in FIG. 6, a suction valve 12A' comprises a valve housing 22, a fixing core 23 to be fixed to the valve housing 22, a movable core 24' to be stored into the valve housing 22 in such a manner that it is disposed opposed to the fixing core 23, a first return spring 25 capable of applying a spring force for moving the movable core 24' apart from the fixing core 23, a coil 26, when energized, capable of applying an electromagnetic force for attracting the movable core 24' toward the fixing core 23 side, and first and second valve mechanisms 29', 30' to be interposed between the outlet port 27 of the valve housing 22 and inlet ports 28, 28, . . .

The first valve mechanism 29' is composed of a movable seat member 44' which can be moved in the axial direction with respect to the movable core 24' in a limited range and is disposed opposed to the movable core 24' on the opposite of the fixing core 23, a second return spring 45 for energizing the movable seat member 44' in a direction where the movable seat member 44' is moved apart from the movable core 24', a rod-shaped first valve part 46' to be fixed to the movable core 24' by pressure insertion within a valve chamber 43 so formed within the valve housing 22 as to be in communication with the inlet ports 28, 28, . . . , a first valve seat 47' formed in the movable seat member 44' in such a manner that the first valve part 46' can be seated on the first valve seat 47', and a first valve hole 48' formed in the movable seat member 44' in such a manner that one end of the valve hole 48' communicates with the outlet port 27 and the other end thereof is opened in the central portion of the first valve seat 47'.

To one end of the movable core 24', there is coaxially fixed a guide cylinder 49 which includes not only a plurality of communication holes 50, 50, . . . but also an engaging flange 49a to be contactable and engageable with the movable seat member 44' from the opposite side of the movable core 24' so as to restrict the maximum distance between the movable core 24' and movable seat member 44'.

On the other hand, the second valve mechanism 30' is composed of: a valve seat member 52 which forms the valve chamber 43 between the movable core 24' and itself and can be fitted with and fixed to the one-end side of the valve housing 22; a second valve seat 53 disposed on the valve seat member 52 in such a manner that it is coaxial with the first valve seat 47' and faces the valve chamber 43; a second valve hole 54 formed in the valve seat member 52 in such a manner that it is larger in diameter than the first valve hole 48', communicates with the outlet port 27 and is opened in the central portion of the second valve seat 53; and, a second valve part 55' disposed on the outer periphery of the movable seat member 44 in such a manner that it can be seated on the second valve seat 53.

On the movable seat member 44', integrally therewith, there is disposed a cylindrical-shaped guide part 57' which can be slidably fitted into the second valve hole 54. Between the outer surface of the guide part 57' and the inner surface of the second valve hole 54, there is formed an annular-shaped passage 58' which, when the second valve part 55' is seated on the second valve seat 53, is cut off from the valve chamber 43 and, when the second valve part 55' is separated from the second valve seat 53, is allowed to communicate with the valve chamber 43; and, there are also formed a plurality of communication passages 59', . . . which allow the annular-shaped passage 58' to communicate with the interior of the guide part 57.

Also, between the inner surface of the second valve hole 54 and the outer surface of the movable seat member 44', there is formed an annular-shaped negative chamber 61 which, when the second valve part 55' is seated on the second valve seat 53, is situated between the second valve seat 53 and annular-shaped passage 58'; and, the pressure receive area A1 of the movable seat member 44', where the movable seat member 44' faces the annular-shaped vacuum pressure chamber 61 on the second valve seat 53 side, is set larger than the pressure receive area A2 thereof where it is faces the annular-shaped vacuum pressure chamber 61 on the annular-shaped passage 58' side.

Further, in the movable seat member 44', there are formed a plurality of communication holes 62, . . . which allow the annular-shaped vacuum pressure chamber 61 to communicate with the intermediate portion of the first valve hole 48'.

In the thus-structured suction valve 12A', when the coil 26 is deenergized, as shown in FIGS. 6 and 7, the movable core 24' has been moved by the spring force of the first return spring 25 to the side where it can be moved apart from the fixing core 23. In this state, the first valve part 46' is seated on the first valve seat 47' and thus the first valve mechanism 29' is closed and, at the same time, the second valve part 55' is seated on the second valve seat 53 and thus the second valve mechanism 30' is closed, whereby the communication between the master cylinder M and first pump 10A is cut off.

Also, in case where the coil 26 is energized in the non-operating state of the master cylinder M, as shown in FIG. 8, the movable core 24' is attracted to the fixing core 23 side. Due to this, the movable seat member 44', which is contacted and engaged with the engaging flange 49a of the guide cylinder 49, is also attracted to the fixing core 23 side. As a result of this, the first valve part 46' is separated from the first valve seat 47' to thereby open the first valve mechanism 29' and also the second valve part 55' is separated from the second valve seat 53 to thereby open the second valve mechanism 30', which allows the master cylinder M and first pump 10A to communicate with each other. In this state, the flow passage area between the inlet ports 28, . . . 28, and outlet port 27 is relatively large and, therefore, a relatively large quantity of brake fluid is sucked from the master cylinder M to the first pump 10A.

Further, in case where the coil 26 is energized in the operating state of the master cylinder M, as shown in FIG. 9, the movable core 24' is attracted toward the fixing core 23 side. However, due to the liquid pressure that is applied to the valve chamber 43 from the master cylinder M, the liquid pressure, which presses the second valve part 55' of the movable seat member 44' against the second valve seat 53, is larger than the electromagnetic force that attracts the movable core 24' toward the fixing core 23 side. Thanks to this, the second valve part 55' is seated on the second valve seat 53 to thereby close the second valve mechanism 30' but, due to the spring force of the second return spring 45 and the electromagnetic suction force of the coil 26, the first valve part 46' is separated from the first valve seat 47' to thereby open the first valve mechanism 29'. Therefore, the flow passage area between the inlet ports 28, 28, . . . and outlet port 27 is relatively small, which reduces the quantity of the brake fluid to be supplied to the first pump 10A from the master cylinder M.

By the way, the state, in which the first valve mechanism 29' is open and the second valve mechanism 30' is closed, can be maintained by the liquid pressure that is generated due to the pressure difference between the liquid pressure on the valve chamber 43 side and the liquid pressure on the outlet port 27 side smaller than the former liquid pressure to press the movable seat member 44' to the side where the second valve part 55' can be seated on the second valve seat 53. In case where the sucking quantity of the brake fluid to the first pump 10A is relatively small, the above pressure difference is small, thereby raising a possibility that the valve closed state of the second valve mechanism 30' cannot be maintained.

However, the annular-shaped vacuum pressure chamber 61, which is situated between the second valve seat 53 and annular-shaped passage 58' in a state where the second valve mechanism 30' is open, that is, in a state where the second valve part 55' is seated on the second valve seat 53, is formed between the inner surface of the second valve hole 54 and the outer surface of the movable seat member 44' in such a manner that the pressure receive area A1 where the movable seat member 44' faces the annular-shaped vacuum pressure chamber 61 on the second valve seat 53 side is larger than the pressure receive area A2 where the movable seat member 44' faces the annular-shaped vacuum pressure chamber 61 on the annular-shaped passage 58' side; and, in the movable seat member 44', there are formed the plurality of communication holed 62, . . . which allow the annular-shaped vacuum pressure chamber 61 to communicate with the intermediate portion of the first valve hole 48'.

Thanks to this, in a state where the second valve mechanism 30' is closed while the first valve mechanism 29' is open, as the brake fluid flows through the first valve hole 48', the brake fluid is sucked out from the annular-shaped vacuum pressure chamber 61 through the communication holes 62, . . . to the first valve hole 48' side, which generates a vacuum pressure in the annular-shaped vacuum pressure chamber 61. This can generate a vacuum pressure force which attracts the movable seat member 44' to the side where the second valve part 55' can be seated on the second valve seat 53; and thus, even in case where the pressure difference between the liquid pressure on the valve chamber 43 side and the liquid pressure on the outlet port 27 side is small, the valve closed state of the second valve mechanism 30' can be maintained more positively.

Therefore, when reducing the quantity of the brake fluid to be supplied to the first pump 10A from the master cylinder M by opening the first valve mechanism 29' and closing the second valve mechanism 30' in the operating state of the master cylinder M, there is eliminated a possibility that the second valve mechanism 30' can be prevented from opening undesirably. This can prevent generation of the operating sounds as well as can prevent the excessive insertion of the brake pedal P as much as possible.

Although description has been given heretofore of the embodiments of the present invention, the present invention is not limited to the above embodiments but various changes in design are possible without departing from the appended patent aspects of the present invention.

As has been described above, according to the present invention as set forth in the first aspect, in a state where the second valve mechanism is open, while securing the flow passage communicating from the valve chamber to the outlet port, the axial line of the movable seat member is prevented from inclining to thereby be able to maintain positively not only the sitting seal performance between the first valve part and first valve seat but also the sitting seal performance between the second valve part and second valve seat.

Also, according to the present invention as set forth in the second aspect, a state, in which the first valve mechanism is open and the second valve mechanism is closed, can be maintained more positively.

What is claimed is:

1. An electromagnetic valve, comprising:

a cylindrical-shaped valve housing including an outlet port in one end thereof and an inlet port in the side wall of the axial-direction middle portion thereof;

a fixing core to be fixed to the valve housing so as to close the other end of the valve housing in a fluid-tight manner;

a movable core stored in the valve housing so as to be opposed to the fixing core;

a first return spring applying a spring force for moving the movable core so as to apart from the fixing core;

a coil applying an electromagnetic force for attracting the movable core toward the fixing core in energized condition; and, first and second valve mechanisms respectively interposed between the inlet port and outlet port, the first valve mechanism including a movable seat member disposed opposed to the movable core on the opposite side of the fixing core so as to be moved in the axial direction thereof with respect to the movable core in a limited range, a second return spring for pushing the movable seat member to the side where the movable seat member is moved apart from the movable core, a first valve part disposed on the movable core within a valve chamber so formed in the interior of the valve housing as to be in communication with the inlet port, a first valve seat disposed on the movable seat member in such a manner that the first valve part is seated on the first valve seat, and a first valve hole formed in the movable seat member in such a manner that one end thereof is communicatable with the outlet port and the other end thereof is opened in the central portion of the first valve seat, the second valve mechanism including a cylindrical-shaped valve seat member fittable and fixable to one end side of the valve housing while forming the valve chamber between the movable core and itself, a second valve seat disposed on the valve seat member so as to be situated coaxially with the first valve seat and faces the valve chamber, a second valve hole formed in the valve seat member so as to be larger in diameter than the first valve hole, communicates with the outlet port and is opened in the central portion of the second valve seat, and a second valve part disposed on the outer periphery of the movable seat member so as to be seated on the second valve seat, wherein, on the movable seat member, there is integrally disposed a cylindrical-shaped guide part which, when the second valve part is seated on the second valve seat, is cut off from the valve chamber but, when the second valve part is separated from the second valve seat, forms an annular-shaped passage communicating with the valve chamber and is slidably fitted into the second valve hole; and, in the guide part, there is formed a communication passage for allowing the annular-shaped passage to communicate with the interior of the guide part.

2. The electromagnetic valve as set forth in claim 1, wherein an annular-shaped vacuum pressure chamber, which is situated between the second valve seat and annular-shaped passage while the second valve part is seated on the second valve seat, is formed between the inner surface of the second valve hole and the outer surface of the movable seat member in such a manner that pressure receive area thereof facing the movable seat member on the second valve seat side is set larger than pressure receive area thereof facing the movable seat member on the annular-shaped passage side; and, in the movable seat member, there is formed a communication hole for allowing the annular-shaped vacuum pressure chamber to communicate with the intermediate portion of the first valve hole.

* * * * *